United States Patent [19]

Rosenthal et al.

[11] 4,126,780
[45] Nov. 21, 1978

[54] ON THE FLY OPTICAL CARD READER

[75] Inventors: Alan S. Rosenthal, New York; Bernard R. Fernau, Malverne; Stanley Seifer, West Hempstead, all of N.Y.

[73] Assignee: Decicom Systems, Inc., Farmingdale, N.Y.

[21] Appl. No.: 724,187

[22] Filed: Sep. 17, 1976

[51] Int. Cl.² .......................... G06K 7/14; G06K 5/00; G06K 13/00
[52] U.S. Cl. .................................... 235/458; 235/380; 235/482
[58] Field of Search ................. 235/61.11 E, 61.11 D, 235/61.7 B, 61.11 R, 61.7 R, 61.11 B; 250/568, 569; 271/169; 340/149 A; 200/46

[56] References Cited

U.S. PATENT DOCUMENTS

| 3,474,230 | 10/1969 | McMillen | 235/61.7 R |
|---|---|---|---|
| 3,695,510 | 10/1972 | Ruesch | 235/61.11 B |
| 3,777,120 | 12/1973 | Menger | 235/61.11 R |
| 3,790,758 | 2/1974 | Tanigawa | 235/61.11 R |
| 3,852,572 | 12/1974 | Nicoud | 235/61.11 E |
| 3,894,215 | 7/1975 | Lotter | 235/61.11 E |
| 3,947,666 | 3/1976 | Carlson | 235/61.11 E |
| 3,984,049 | 10/1976 | Shawen | 235/61.11 D |

*Primary Examiner*—Robert M. Kilgore
*Attorney, Agent, or Firm*—Blum, Moscovitz, Friedman & Kaplan

[57] ABSTRACT

An on the fly optical card reader is provided for reading a card or badge bearing a predetermined number of digits of identifying data spaced in one direction along the card or badge. A guide mechanism guides the displacement of the card past an essentially slot-shaped optical sensing arrangement extending transversely relative to the path of the card and consisting of a light source on one side of the card and a plurality of light detectors on the other side of the card. A correspondingly slotted spring member biases portions of the card on opposite sides of said optical sensing arrangement in the direction of said light detectors. The device is adapted for temporary storage of the output of he optical sensing arrangement and transmission thereof upon detection of the proper passage of the card past the sensor. One aspect of such detection is a bottom detection member selectively displaceable along the length of the path of the card or badge to accommodate cards and badges of different lengths and positioned to only provide a bottom indication if in registration with a cutaway portion of the card representative of proper orientation of the card.

41 Claims, 10 Drawing Figures

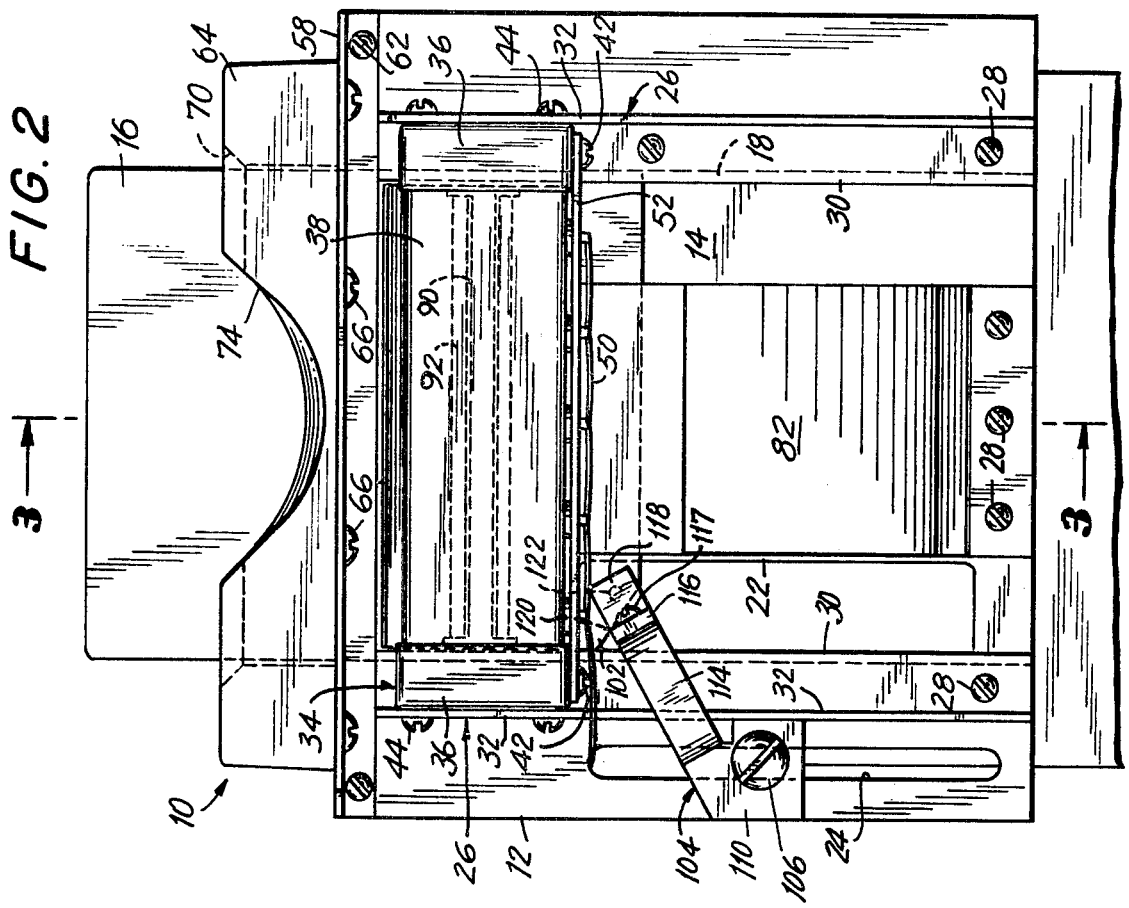
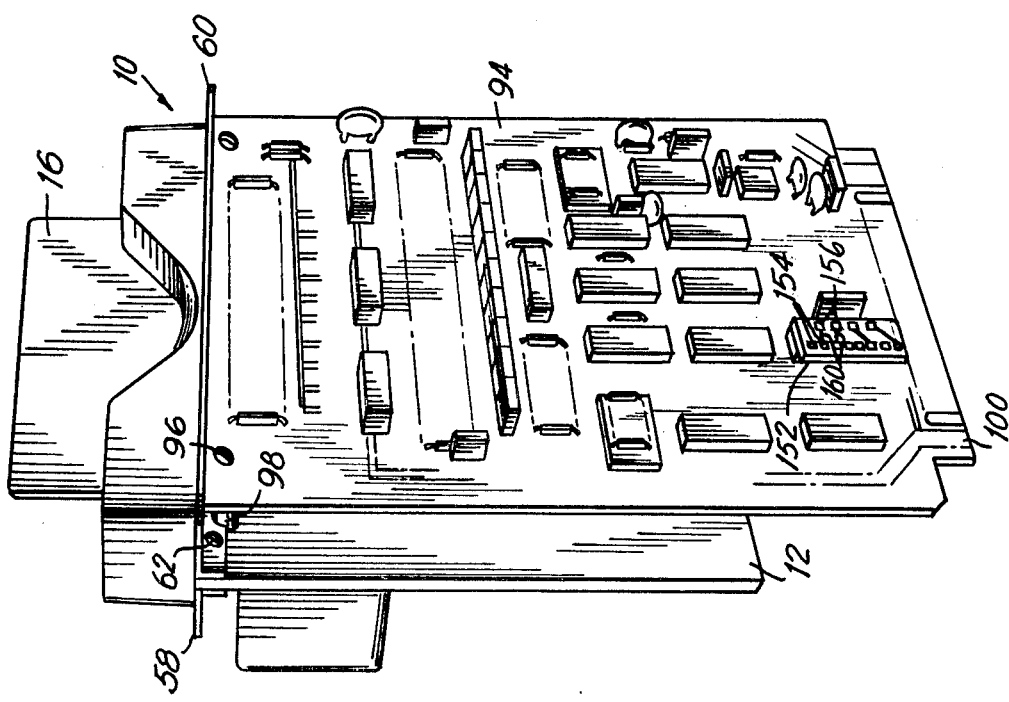

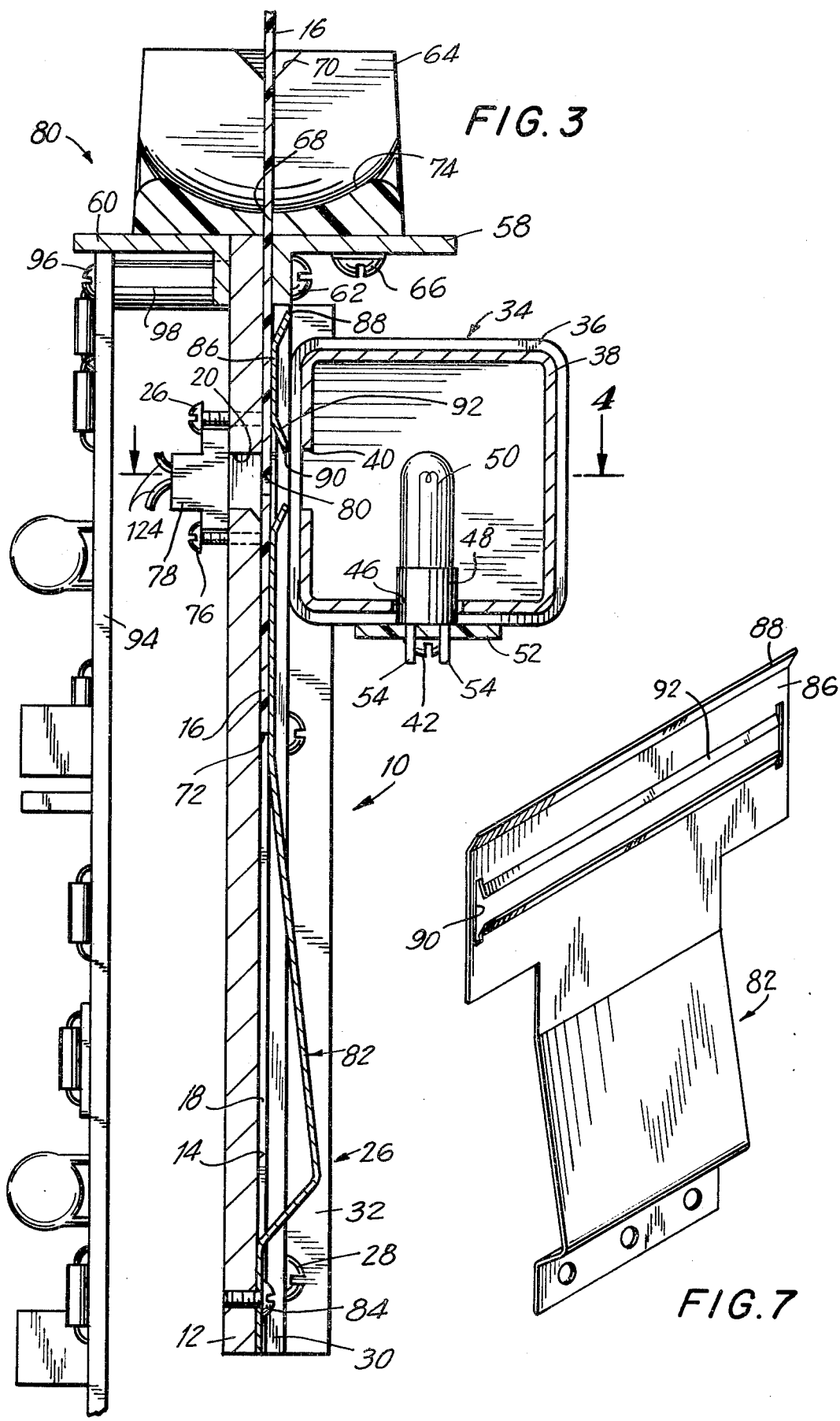

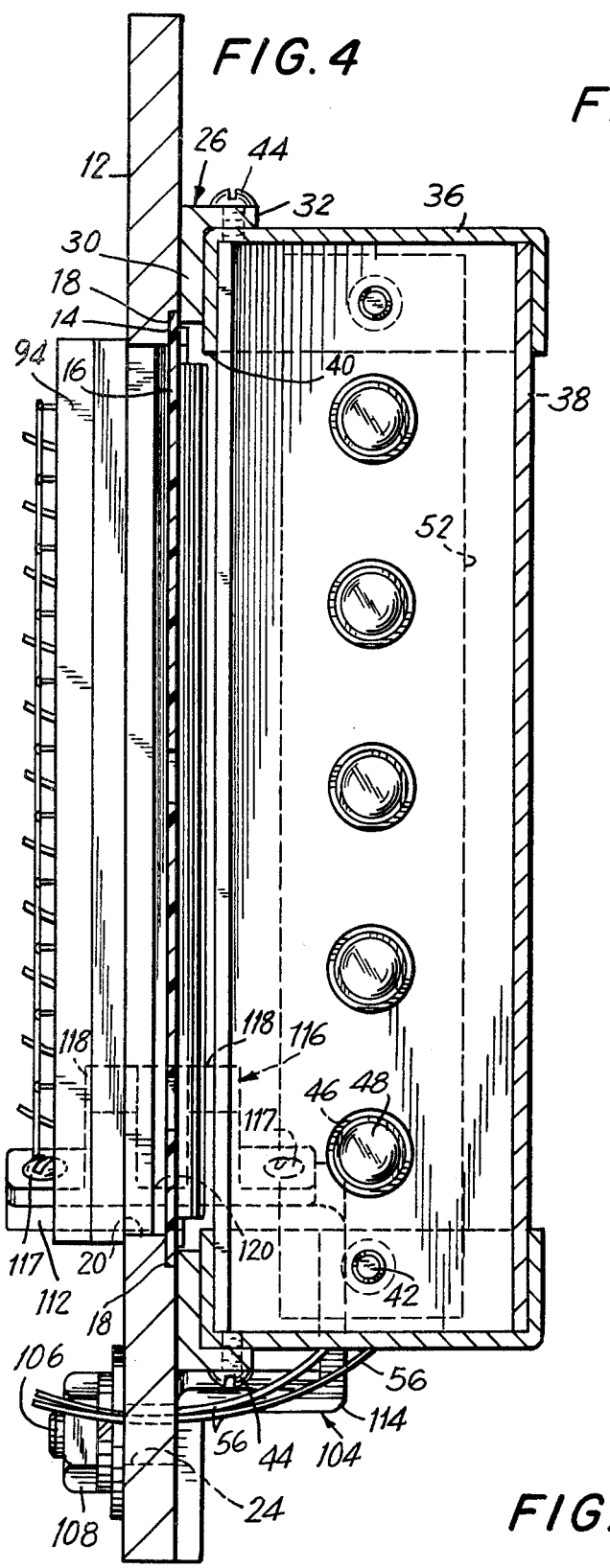
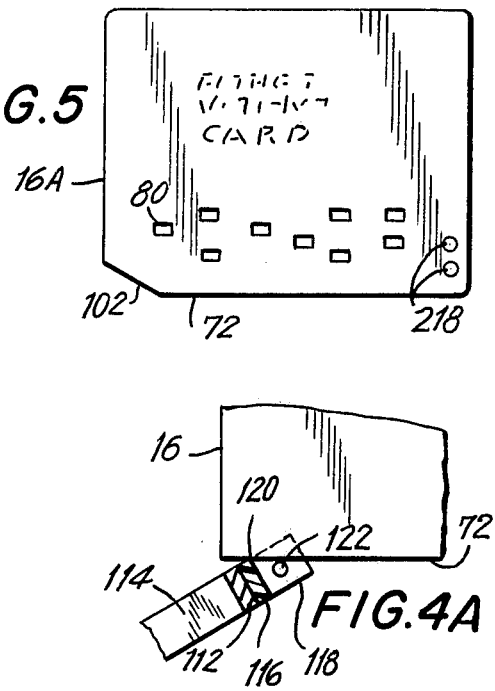
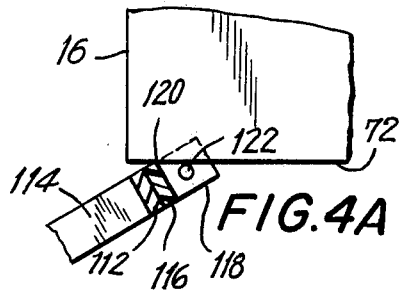
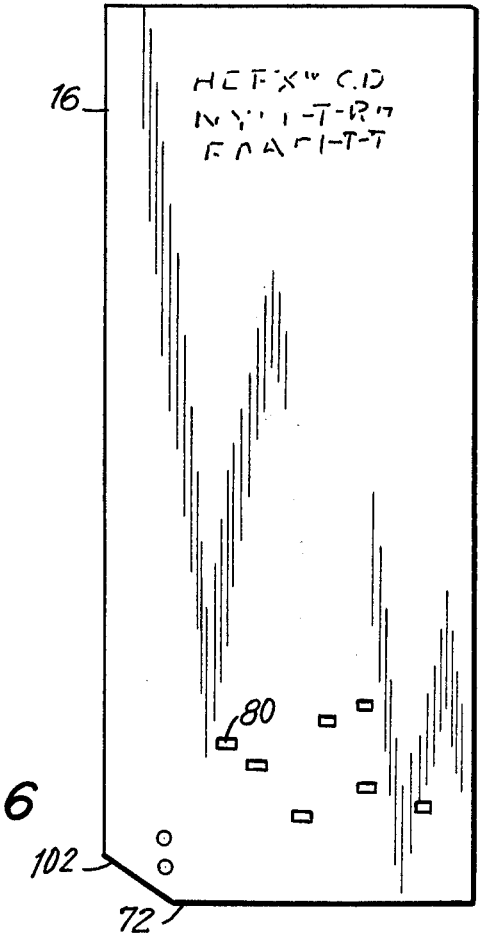

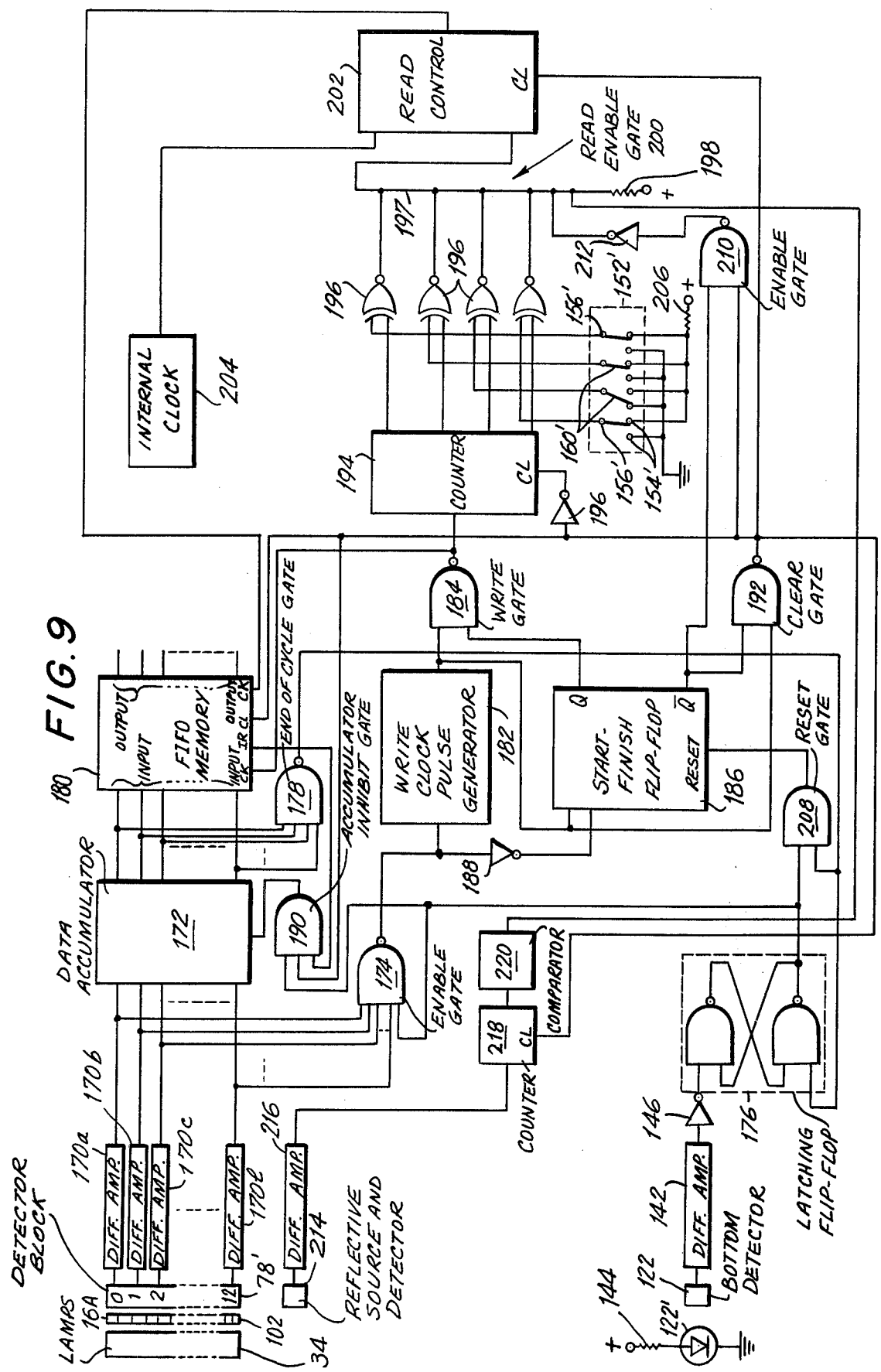

ON THE FLY OPTICAL CARD READER

BACKGROUND OF THE INVENTION

This invention relates to optical on-the-fly card and badge readers for "reading" punched cards and badges, and transmitting the read data to a utilization device such as a digital computer or recording device. On-the-fly reading of punched cards and badges requires much less elaborate optical systems and card alignment systems than that required for a static card reader. However, a difficulty with on-the-fly card readers is that they are susceptible to misreadings due to simultaneous reading of more than one "digit" data or the reading of erroneous data due to less than complete insertion of the card or the jiggling of the card during insertion. One solution to the foregoing problems is disclosed in U.S. Pat. No. 3,894,215, assigned to the assignee hereof, which discloses an on-the-fly card reader applicable to the time clock system disclosed as well as capable of general application. The operation of the system of U.S. Pat. No. 3,894,215 is improved by the features in accordance with the invention.

SUMMARY OF THE INVENTION

Generally speaking, in accordance with the invention, an on-the-fly optical card reader is provided for use with a time card having identifying indicia on a portion thereof arranged in a plurality of digits spaced in one direction along said card wherein card guide means defines a path for the displacement of said card past an essentially slot-shaped optical detection means in a direction substantially parallel to said one direction along said card. Said optical detection means includes light source means on one side of said card and a plurality of light detectors on the opposite side of said card. Spring means is provided for biasing portions of said card on opposite sides of said optical detection means as viewed in said one direction along said card.

Means is provided for detecting the proper passage of the card past the light detection means, said detecting means including a bottom detection member for producing a signal upon the proper positioning of the card relative thereto. The bottom detection member is displaceable along said card guide means in said one direction along said card to accommodate cards of various dimensions and is further positioned for providing an output signal only when a cut-away portion of the bottom of the card is in registration therewith, so as to insure proper card orientation. Said proper passage detecting means also includes means for counting the number of digits of data read for producing an output signal representative of a selected correct count. Means is provided for selecting the desired count through selective electrical connection of pairs of terminals. A circuit for insuring the proper reading of a hollerith coded card is also provided including circuit means for avoiding the effect of skewing of the card in the guide means.

Accordingly, it is an object of the invention to provide an improved on-the-fly optical card reader capable of accurate reading and transmission of data only upon such accurate reading, and further selectively adaptable for a plurality of uses.

Still other objects and advantages of the invention will in part be obvious and will in part be apparent from the specification and drawings.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a front perspective view of the on-the-fly optical card reader in accordance with the invention;

FIG. 2 is a rear fragmentary elevational view of the optical card reader of FIG. 1;

FIG. 3 is a sectional view taken along lines 3—3 of FIG. 2;

FIG. 4 is a sectional view taken along lines 4—4 of FIG. 3;

FIG. 4A is an enlarged fragmentary sectional view of the bottom detection arrangement in accordance with the invention in conjunction with an incorrectly inserted card;

FIG. 5 is a top view of a punched badge capable of reading by the on-the-fly optical card reader in accordance with the invention;

FIG. 6 is a top view of a punched card capable of reading by the on-the-fly optical card reader in accordance with the invention;

FIG. 7 is a perspective view of the biasing spring of the card reader in accordance with the invention;

FIG. 9 is a block circuit diagram of an alternate embodiment of the on-the-fly optical card reader adapted for reading cards punched with a hollerith code.

DESCRIPTION OF THE PREFERRED EMBODIMENTS

Figure 8:
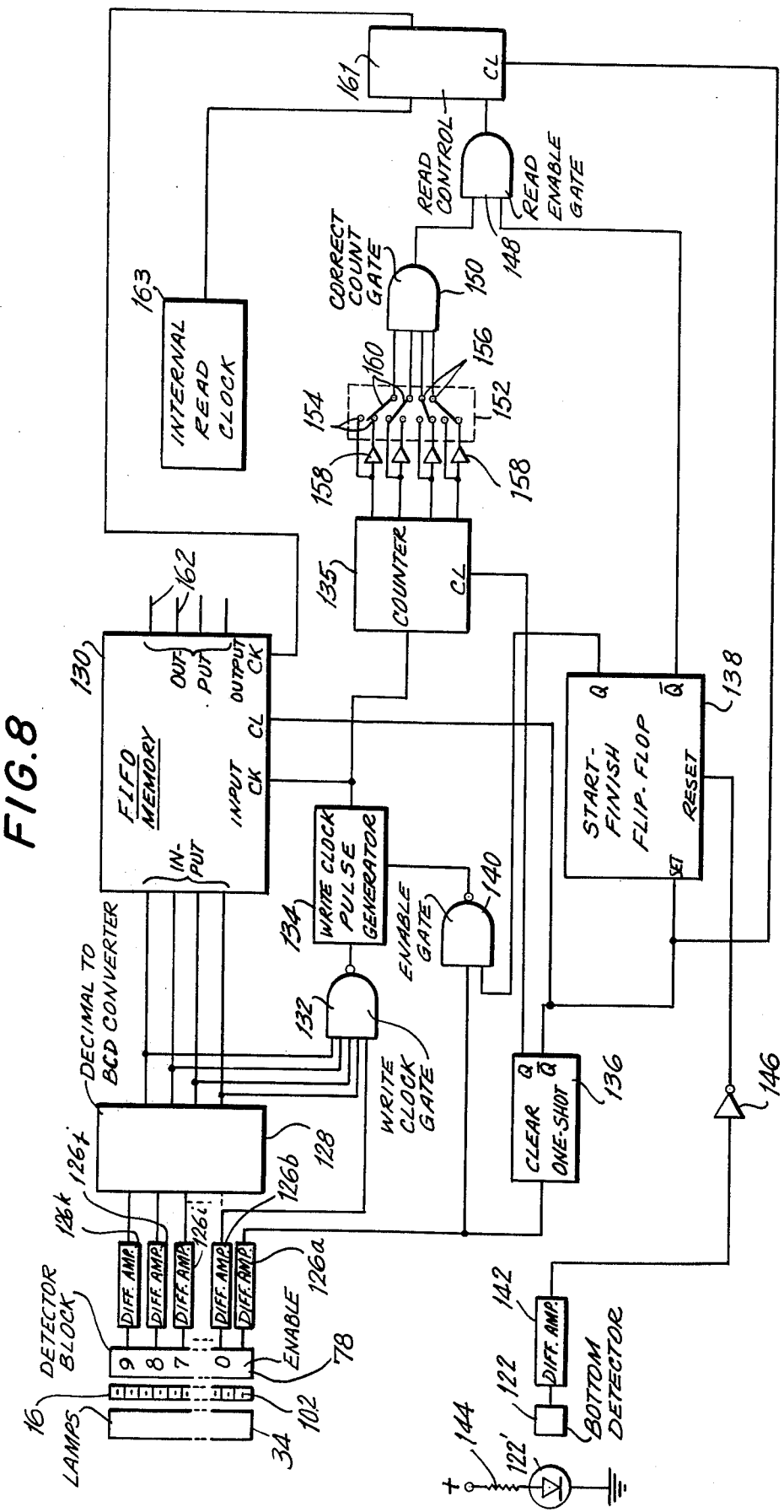
FIG. 8 is a block circuit diagram of the embodiment of the on-the-fly optical card reader in accordance with the invention of FIG. 1.

Referring now to FIGS. 1–4, the on-the-fly optical card reader 10 depicted includes a frame 12 formed with a longitudinally extending central region 14 formed with a longitudinally extending surface groove 14 dimensioned to accommodate a punched card 16 between the side walls 18 thereof. Groove 14 is also of a depth to accommodate the thickness of card 16 as more particularly depicted in FIGS. 3 and 4. A laterally extending slot 20 is formed in frame 12 in the upper region of groove 14 and a longitudinally extending slot 22 is formed in frame 12 on one side of the region of groove 14. A second longitudinally extending slot 24 is formed in frame 12 outside of the region of groove 14 but on the side of said frame adjacent slot 24. Slots 22 and 24 extend substantially parallel to each other with slot 22 being wider than slot 24. A pair of longitudinally extending guide brackets 26 of substantially L-shaped cross-section are mounted by means of screws to frame 12 on opposed sides of groove 14. Each of said guide brackets has a first wall 30 which engages frame 12 and projects into groove 14 to define a path for the transverse of card 16 by retaining said card with groove 14. A second wall 32 of each guide bracket 26 projects substantially normally from frame 12 and provides a support for a lamp housing 34. Lamp housing 34 consists of a pair of end caps 36 surrounding and retaining an elongated housing member 38 formed of sheet material folded to define a substantially square cross-section and a slot opening 40 positioned for registration with laterally extending slot 20 in frame 12. End caps 36 are secured to housing member 38 by means of screw 40, said end caps being secured to second wall 30 of each guide bracket 26 by screws 44 to position said lamp housing relative to slot 20 in frame 12. A side wall of housing member 38 adjacent the wall thereof containing slot 40 is formed with a plurality of apertures 46 therethrough spaced longitudinally of housing member 38 so as to extend substantially parallel to slot 40 but in a wall extending at substantially a right angle to the wall in which slot 40 is formed (FIG. 3). Mounted within each of apertures 46 is an incandescent lamp 48 which projects into lamp housing 34 so that the filament 50 of each of the lamps is substantially aligned with slot 40. The respective lamps are mounted on a lamp holder 52 so that pin electrodes 54 extend through lamp holder 52 for electrical connection in parallel as illustrated by leads 56 (FIG. 2). Lamp holder 52 is secured to end caps 36 by means of screws 42.

A pair of top brackets 58, 60, each of substantially L-shaped cross-section are respectively secured by one wall thereof to the top of frame 12 by means of screws 62. A throat member 64 is secured to top bracket 58 by means of screws 66, said throat member being formed with a slot 68 therethrough dimensioned to receive card 16 and positioned for registration with groove 14 so as to provide an extension of the groove. Slot 68 is formed with a V-shaped region 70 at the entrance thereof for guiding the bottom edge 72 of card 16 into slot 68 and is further provided with a curved cut-away region 74 to permit grasping of a card inserted in the card guide defined by aperture 68 in throat 74, groove 14 in frame 12 and guide brackets 26.

Secured to the rear of frame 12 by means of screws 76 is a light detector block 78 which supports a plurality of light detection devices positioned in side-by-side spaced relation in registration with slot 20 in frame 12 for detecting light transmitted through apertures 80 in card 16. As more particularly seen in FIG. 6, each punched card 16 is provided with a plurality of punched holes 80 at predetermined locations thereon representative of the data coded on the card. In the embodiment illustrated in FIG. 6, each digit of data is represented by a single hole, the lateral position of which is indicative of the coded value, there being 10 positions representative respectively of numerals 0 through 9. Each lateral line represents a single digit, the digits being spaced longitudinally of the card in the direction that the card is advanced through the guide slot of the card reader 10. FIG. 5 depicts an alternate embodiment wherein a shorter badge-type card 16A is depicted. The card of FIG. 5 is coded in a hollerith code wherein anywhere from 1 to 3 holes may appear on each lateral line there being 12 potential positions for holes on each line representative of numerals 0 through 12. Again, the successive digits are spaced longitudinally of the card in the direction that the card is fed, edge 72 being the bottom edge of the card 16A. The particular embodiment illustrated in FIGS. 1-4 is adapted to read a card of the type of FIG. 6 and accordingly 10 spaced light detection devices, such as photo-transistors, are arranged on light detection block 78 in a line extending parallel to slot 20 and positioned and spaced so that each photo-transistor is in registration with one of the 10 fields in which a hole 80 may appear. An additional "enable" light detection device would be mounted on said light detector block on one side of said line for registration with cut-away region 102 of card 16 as more particularly described below.

The card 16 is biased against the back wall of groove 14 by means of a spring 82 more particularly depicted in FIG. 7. Spring 82 is centrally located in groove 14 and secured thereto at the bottom of said groove by means of screws 84. The spring is provided with an essentially flat card engaging portion 86 which engages the card against the back wall of groove 14. The top edge of card engaging portion 86 terminates in an inclined flange 88 which guides bottom edge 72 of the card to permit the card to displace spring 82 away from the back wall of groove 14 when the card is inserted therepast. Card engaging portion 86 of spring 82 is formed with a central laterally extending slot 90 in registration with slot 40 in lamp housing 34 and slot 20 in frame 12. In effect, slot 90 is positioned intermediate slot 40 and slot 20 to permit the passage of light from the lamp housing to the light detector block 78. The upper and lower peripheral edges of slot 90 are formed with inclined flanges which project toward lamp housing 34 and serve to aid in shielding the light path between lamp housing 34 and light detector block 78 from spurious sources of exterior light.

In order to provide a unitary card reader, the electronic circuitry associated with the reading, error detection and data storage functions may be mounted on a circuit board 94 secured to frame 12 by means of screws 96, said circuit board being positioned in spaced relation from frame 12 by means of spacers 98. Circuit board 94 may contain various integrated and discrete circuit elements and may be provided with a plurality of terminals 100 on one edge thereof suitable for plugging into a corresponding receptical for electrical connection to a suitable utilization device such as a time clock, digital computer, data transmission device or the like.

As is more particularly depicted in FIGS. 2 and 6, the card 16 is provided with a cut-away region 102 in the bottom left-hand corner thereof as viewed in FIG. 2 which provides a means for insuring the proper orientation of the card so that the field of data representing the numeral 1, by way of example, is aligned with the corresponding photo-transistor. To insure that the card is properly aligned in card reader 10, a bottom detector bracket 104 is mounted in longitudinal slot 24 of frame 12 by means of bolt 106 and nut 108, which nut and bolt permit selective positioning of bottom detector bracket 104 longitudinally along slot 24. Said bottom detector bracket includes a mounting portion 110 in engagement with frame 12, a detector support portion (FIG. 4) which extends through slot 22 in frame 12 and an essentially L-shaped connecting portion 114 coupling said mounting and detector support portions. Bottom detector 116 is secured to detector support portion 112 of bottom detector bracket 104 by means of screws 117 (FIGS. 2 and 4) and is provided with a pair of spaced projecting arms 118 which respectively carry a solid state light source such as a light emitting diode and a solid state light detector such as a photo-transistor in spaced facing relation across the gap between arms 118. As is more particularly illustrated in FIG. 4A, which shows a sectional view taken through the gap between arms 118, connecting portion 114 of detector bracket 104 is inclined at an angle to slot 24 so that the highest point in the base of the gap between arms 118 in corner 120. If the card 16 is inserted incorrectly, as illustrated in FIG. 4A, then bottom edge 72 engages corner 120 and is stopped thereby before it could intercept the light path between the light emitting diode (not shown) and photo-transistor 122 mounted on arms 118. On the other hand, if, as illustrated in FIG. 1, the card 16 is properly aligned, the cut-away region 102 thereof permits the card to be inserted a sufficiently greater distance so as to intercept the light path of bottom detector 116 to produce a bottom detection signal which will be discussed more particularly below.

Leads (not shown) are provided electrically connecting bottom detector 116 and circuit board 94. Lamp housing 34 may be electrically connected to said circuit board by leads 56 and light detector block 78 may be likewise connected to circuit board 94 by leads 124, fragmentarily shown in FIG. 3.

The on-the-fly optical card reader 10 in accordance with the invention is particularly adapted for association with a plurality of devices wherein the reading of punched cards is required. One embodiment of circuitry for effecting card reading is depicted in U.S. Pat. No. 3,894,215 which is incorporated herein by reference as if fully set forth.

Referring now to FIG. 8, a block circuit diagram of a second embodiment of the circuitry of the on-the-fly optical card reader in accordance with the invention is depicted. As discussed above, detector block 78 is provided with 11 photo-transistors, one for each numeral field position from 0 through 9 and the 11th representative of an enable position, said 11th photo-transistor being positioned for registration with the cut-away corner 102. The output of each photo-transistor is applied to a differential amplifier 126a, b, . . . k. Each of the differential amplifiers is of conventional construction connected as a Schmitt trigger to produce a pulse output for each transistion from detection of light to detection of darkness and is selectively tunable for accomodating the threshold voltage of the associated photo-transistor by selection of one or more of the resistors thereof. The outputs of differential amplifiers 126c through 126k are representative of numerals 1 through 9 and are applied to a decimal to BCD converter 128 which converts the detected signal from decimal to binary coded decimal form. The output of decimal to BCD converter 128 is applied along four lines as the input to a first in, first out memory 130, preferably in the form of an integrated circuit chip. The BCD outputs of converter 128 are also applied as inputs to write clock gate 132 in the form of a NAND gate, said NAND gate also receiving as an input the output of differential amplifier 126b, representative of the zero numeral position. When a signal is detected at any one of numeral field positions 0 through 9 by the associated photo-transistor, which signal is representative of a hole at that field position, an output is produced at write clock gate 132 which is applied to write pulse generator 134 which, when enabled as more particularly described below, produces a self-clock output signal for each output pulse from write clock gate 132. The self-clock output signal of pulse generator 134 is applied as a clocking signal to memory 130 and is further applied as an input to counter 135 for purposes which will be more particularly described below.

The enable photo-transistor is provided to clear the system for the cycle about to be started and to insure proper sequencing. When the card is properly inserted, the enable photo-transistor will be cut-off after the photo-transistors associated with digits 0 through 9 so that the enabling and clearing functions performed in response to the signal from differential amplifier 126a occur after and eliminate the effect of signals produced in the remaining differential amplifiers by the initial insertion of the card. The output of differential amplifier 126a representative of the enable photo-transistor is applied to clear one-shot device 136 which produces one change of state in response to the output of differential amplifier 126a representative of the cutting off of the enable photo-transistor. The Q output of clear one shot device 126 is applied to clear counter 135 so that it is able to start a fresh count in response to the output of write clock pulse generator 134.

The $\overline{Q}$ output of clear one shot device 136 is applied to memory 130 to clear same to receive data from decimal to BCD converter 128. The $\overline{Q}$ output of clear one shot device 136 is also applied to the set terminal of start-finish flip-flop 138 to set same. The Q output of start-finish flip-flop 138 is applied as one of the two inputs to enable gate 140, the other input being the output from differential amplifier 126a. The output of enable gates 140, which is in the form of a NAND gate, is applied to enable write clock pulse generator 134 to produce said self clock signal upon the receipt of inputs from write clock gate 132. As the card is passed along the card guide defined in part by groove 14 in frame 12, the digits of data punched on the card are carried past the detector block and each punched hole representative of a digit of data causes an output signal from one of differential amplifiers 126b, c, . . . k to produce an output from write clock gate 132 to produce a self clocking signal to clock into memory 130 the data then in decimal to BCD converter 128. When the card reaches the bottom detector 122, an output is produced on differential amplifier 142 due to the interruption of the light path between light emitting diode 122′ and the photo-transistor 122, said light emitting diode being connected between ground and a voltage source through resistor 144. The output of differential amplifier 142 representative of the end of the write portion of the cycle is applied through inverter 146 to the reset terminal of start-finish flip-flop 138 to reset same. When flip-flop 138 is reset, the output signal on enable gate 140 changes state to disable the application of self-clock pulses from write clock pulse generator 134 to memory 130 and counter 135. Similarly, the $\overline{Q}$ output of flip-flop 138 is applied to one of the inputs of read enable gate 148, perferably an AND gate. The other input to read enable gate 148 is correct count gate 150, also an AND gate.

It is important not to transmit data unless the correct number of digits have been counted so as to avoid transmission of spurious data which could be caused by jiggling of the card or an improperly punched card. The desired count is selected by means of selector block 152 which consists of a circuit board (FIG. 1) having eight terminals 154 on one side thereof and four terminals 156 on the other side thereof. Four of the eight terminals 154 are directly connected to the four BCD output terminals of counter 135 while the remaining four terminals 154 on selector 152 are connected to said four BCD outputs of counter 135 through inverters 158. The desired count may be selected either at the factory or by the user by the selective connection of each of terminals 156 to one of the two corresponding terminals 154, either the terminal directly connected to counter 135 or the terminal connected through inverter 158. Such connection could be by way of leads 161 (FIGS. 1 and 8). In this manner, the card reader in accordance with the invention is adapted for a broad range of uses and may be selectively disposed to accomodate a particular card having a particular number of digits through selection of the desired count by means of setting selector 152 and by adjusting the position of the bottom detector bracket 104 as described above. Read enable gate 148 produces an output which sets read control device 161 to enable the transmission of an output clock to memory 130 to permit the sequential transmission out of memory 130 along output lines 163 of the data stored therein. The clock signal transmitted by read control 161 can be either from internal read clock 163 or from an externally applied clock signal. If desired, certain of the signals of the circuit may likewise be transmitted such as the output of read enable gate 148 which would provide a read ready indication; the output of differential amplifier 126a which would provide an indication of the insertion of the card; the output of inverter 146 which would provide an indication of the actuation of the bottom detector; and the output of the $\overline{Q}$ terminal of clear one-shot 136 which would provide an indication that the memory and counter has been cleared. Said $\overline{Q}$ output of clear one-shot 136 is applied to the clear terminal of read control 161 to reset same at the beginning of each cycle.

By the foregoing arrangement, data is read out of the card reader only upon the traverse of the card past detector block 78 such that a pre-set number of digits are counted and the bottom detector provides an indication of complete traverse. The data remains stored in the memory until the next cycle and is available for reading after actuation of the bottom detector.

Referring now to FIG. 9, the circuit block diagram depicted is of a third embodiment of the circuityy of the card reader in accordance with the invention particularly adapted for reading a hollerith type card such as card 16A of FIG. 5. Since a hollerith code has 12 potential fields of data, detector block 78' is provided with twelve photo-transistors or the like, one for each field. In this embodiment a separate enable light detector is not provided, but the twelfth field of data and therefore the twelfth photo-transistor may be positioned in registration with the cut-away corner region 102 of card 16A. The output of each of the twelve photo-transistors is connected to a differential amplifier 170a, b, . . ., l similar in structure and operation to differential amplifiers 126 of the embodiment of FIG. 8. The output of all 12 differential amplifiers is applied to a data accumulator 172 and to the input of an enable gate 174 which takes the form of a NAND gate. Data accumulator 172 preferably takes the form of a group of R-S flip-flops similar in structure to latching flip-flop 176 which will be more particularly discussed in connection with the operation of bottom detector 22. Such latching flip-flops are characterized by the state of the output terminal changing upon the application of a signal of a predetermined state at the input and latching to that state until a reset signal is applied on a reset terminal to release the latch. A special characteristic of such R-S flip-flops is that when a signal is simultaneously applied to both the set and the reset terminals, the output is of the same state as when the flip-flop is latched. This feature is utilized is connection with the end of cycle gate 178 as will be more particularly described below.

Data accumulator 172 is provided intermediate differential amplifiers 170 and first in, first out memory 180 to avoid skewing problems particular to hollerith coded cards. Since a digit of data may consist of more than one punched hole, it is desirable not to clock data into the memory until all of the holes associated with a single digit have been detected. This result is achieved in part by enable gate 174 which produces an output responsive to an all-darkness condition. In other words, a first pulse is produced by enable gate 174 in response to the darkness detected by the photo-transistors upon the insertion of the card and thereafter a pulse is produced by enable gate 174 after each line of punched holes representative of a single digit have passed the detector block 78'. In order to insure that writing only occurs during the time between the insertion of the card and the actuation of the bottom detector, the output of latching flip-flop 176 representative of the actuation of bottom detector 122 is applied as an additional input to enable gate 174. The gate, in the form of a NAND gate, will therefore only produce an output during the traverse of card from insertion to the bottom detector and not thereafter. The output of enable gate 174 which is a pulsed output is applied as an input to write clock generator 182 which produces a pulse for each input received from enable gate 174, the output of said pulse generator being applied to a write gate 184. Since the first valid data is not inserted in the data accumulator 172 until after the first output of enable gate 174, only the second through the last pulse outputs of pulse generator 182 are transmitted by write gate 184, which takes the form of an AND gate. This result is achieved by means of start-finish flip-flop 186 which may be of the J-K type. Start-finish flip-flop 186 receives as inputs the output of write clock pulse generator 182 and the output of enable gate 174 transmitted through inverter 188 and is set into a first state in response to the first transition to all darkness. The Q output of start-finish flip-flop 186 is connected as the second input to write gate 184. In this manner, write gate 184 is not enabled so as to permit the passage of clock pulses from pulse generator 182 until after the first pulse. Thereafter, the write clock signals are transmitted to the clock terminal of memory 180, the latched contents of data accumulator 172 being stored in the memory in response to each clock signal. The accumulation of data in data accumulator 172 and the clearing thereof is effected by accumulator inhibit gate 190 which is in the form of an AND gate. The inputs to accumulator inhibit gate 190 are the output of latching flip-flop 176 representative of whether or not the card has actuated bottom detector 122, the output of clear gate 192, the function of which will be discussed below, and the "input ready" (IR) output of memory 180. The output of accumulator inhibit gate 190 is applied to the reset terminal of the various R-S flip-flops of data accumulator 172 so that said flip-flops do not latch to accumulate data during the period that memory 180 is not providing an "input ready" signal. The "input ready" signal is indicative of the fact that the memory is available to receive data. The "input ready" signal is not sent out when the memory is full, and for the period of each write clock signal or longer if required for data storage. The latter case permits clearing data accumulator 172 through accumulator inhibit gate 190 after each digit is read into the memory in response to the write clock signal.

Clear gate 192 produces a pulse clear signal in response to the first pulse output of write clock pulse generator 182. Said gate, in the form of an NAND gate, has as its first input, the output of write clock pulse generator 182 and as its second input the $\overline{Q}$ output start-finish flip-flop 186. The clear signal from clear gate 192 is applied at the beginning of the cycle to clear memory 180 as well as other elements as will be more particularly described below. The pulse output of write gate 184 is applied to counter 194 which counts the number of digits read into memory 180. The input to counter 194 may also be connected to the "input ready" terminal of memory 180 since a pulse output is produced on the input ready terminal for each word clocked into the memory. Counter memory 194 is cleared at the beginning of the cycle through the clear signal from clear gate 192 transmitted through inverter 196. The output of counter 194 is applied along four output lines, each line being connected to one EXCLUSIVE NOR gate 196. The other input to EXCLUSIVE NOR gate 196 is from a terminal 156' of a selector 152', which functions in the same manner as selector 152 of FIG. 8, the "correct count" being selected by the selected interconnection of each terminal 156' to one of the two corresponding terminals 154' by a lead 160'. EXCLUSIVE NOR gates 196 are tied to a common line 197 which is in turn coupled to voltage source through resistor 198 to define, together with several additional connections, a read enable gate 200, the arrangement generally being referred to as an OR-tied comparator. An output signal is applied at line 197 to read control 202 to permit the transmission a read clock signals from internal clock 204 to the output clock terminal of memory 180 upon the coincident occurrence of a plurality of events. Specifically, one condition for the reading of data is that the count in counter 194 correspond to the preselected count estabilished by the setting of selector 152'. In this embodiment, one of each associated pair of terminals 154' is connected to ground and the other of each associated pair of terminals 154' is connected to a voltage source through a resistor 206, the EXCLUSIVE NOR gates 197 comparing the output on each line of counter 194 with the state of the selected associated terminal 156'. Another condition to the passing of an enabling signal by read enable gate 200 is that the card has actuated bottom detector 122. In this embodiment, the signal from differential amplifier 142 representative of the actuation of bottom detector 122 is passed through inverter 146 to the input terminal of latching flip-flop 176 formed from a pair of NAND gates interconnected in a conventional manner. The output terminal of the latching flip-flop 176 is connected as an input to enable gate 174 (to prevent transmission by said enable gate after latching), as an input to accumulator inhibit gate 190 (to prevent data accumulation after latching), and as an input to reset gate 208 (to effect resetting of start-finish flip-flop 186). The output of reset gate 208 is connected to the reset terminal of said flop-flop. The second input to said reset gate is from end of cycle gate 178, a NAND gate that produces an output signal representative of the removal of the card, which signal is also applied to the reset terminal of latching flip-flop 176 to reset said flop-flop for the next cycle. The second input to reset gate 208 is the output of end of cycle gate 178. In other words, end of cycle gate 178 is responsive to the state where all twelve photo-transistors detect a light, in which case the output state of end of cycle gate 178 changes, said output being connected both as an input to reset gate 208 and to the reset terminal of latching flip-flop 176 to reset the latched flip-flop for the next cycle. The fact that the bottom detector 122 has been actuated by a card is transmitted to the read enable gate 200 by means of the $\bar{Q}$ terminal of start-finish flip-flop 186 which is connected as one input to enable gate 210 which is in the form of an NAND gate. The other input to enable gate 210 is the clear signal output from clear gate 192. The output of enable gate 210 is coupled through inverter 212 to line 197 of read enable gate 200. In this manner, two additional conditions are imposed on read enable gate 200, namely that start-finish flip-flop be reset, indicative of actuation of the bottom detector 122, and that the clear signal not be in the process of being transmitted.

A feature of the embodiment of FIG. 9 not found in the above-discussed embodiments and imposed as a condition to the operation of read enable gate 200 is reflective source and detector 214. Said reflective source and detector would consist of side-by-side light source and light detector mounted at a predetermined location in the path of the traverse of card 16A, as, for example, in the bottom wall of groove 14 of frame 12. Said reflective source and detector can take any conventional form as, for example, a light emitting diode and photo-transistor mounted side-by-side so that the light transmitted by the light emitting diode is reflected by the surface of the card back to the adjacent photo-transistor. By this arrangement, reflective source and detector 214 produces a signal representative of a dark region on the card in the path of said reflective source and detector which signal is detected and transmitted by differential amplifier 216. Such dark areas may take the form of filled in circles imprinted on the surface of the card, as, by way of example, circles 218 on card 16A (FIG. 5) aligned longitudinally of the card. The purpose of such printed circles and reflective source and detector 214 is to insure that only cards intended to be read are read. In other words, there are many hollerith coded cards intended for other applications which could be read by the card reader in accordance with the invention, but which are not intended for reading in the particular system in which the card reader is provided. The imprinting of the identifying indicia such as the two (or more) circles 218 provides an indication of the function of the card. The output of differential amplifier 216 is applied to a counter 218 which counts the number of indicia detected by reflective source and detector 214 and applies that count to a comparator 220 which is preset to produce an output signal only when the count in counter 218 corresponds to the preset count, in this case a count of two. If the count of counter 218 equals the present count, then an enabling signal is applied from comparator 220 as still another input to read enable gate 200. Counter 218 and read control 202 are cleared by the clear signal from clear gate 192. As in the case of the embodiment of FIG. 8, the clock signal for reading data out of memory 180 may be an externally applied signal and various ready, enable, clock and clear signals may be taken off suitable locations in the circuit for transmission to an associated utilization device if desired.

While the embodiment depicted in FIG. 9 discloses the transmission of a 12 bit hollerith code, said code can be converted to other forms such as ASCII, either before application to memory 180 or before transmission to the utilization device utilizing well known decoder arrangements.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An on-the-fly card reader for use for a time card having identifying indicia in the form of punched holes on a portion thereof arranged in a plurality of digits spaced in one direction along said card comprising card guide means defining a path for the displacement of said card in a direction substantially parallel to said one direction along said card and including a wall for support of said card during such displacement; lamp housing means mounted on said card guide means in spaced relation to said wall and being formed with an elongated slot opening for transmission of light, said lamp housing slot opening being positioned in facing relation to said wall and extending substantially transverse to said one direction along said card; a plurality of light detection means mounted on said wall along a substantially straight line aligned with and in facing relation relative to said lamp housing slot opening for the passage of said card therebetween; and a spring member positioned to bias said card against said wall on opposed sides of said light detection means as viewed in said one direction along said card, said spring member being formed with a substantially flat card engaging portion extending substantially parallel to said wall, said card engaging portion being formed with an elongated slot opening in the region thereof intermediate said lamp housing slot opening and said line of light detection means.

2. The card reader as recited in claim 1, wherein said wall is formed with a slot opening extending substantially parallel and in facing relation to said lamp housing slot opening, said plurality of light detectors being mounted on the side of said slot opening spaced from said card.

3. The card reader as recited in claim 2, wherein said lamp housing includes a chamber opening on said lamp housing slot opening and a plurality of incandescent lamps positioned in spaced relation within said chamber along a line extending substantially parallel to said slot opening.

4. The card reader as recited in claim 1, including bottom detector means for detecting the passage of said card along said path to the end thereof and means displaceably mounting said bottom detector means in said one direction along said card for selectively setting the length of said path.

5. The card reader for use with a card having a cut-off region in the leading edge thereof as recited in claim 4, wherein said displaceable bottom detector means includes means for producing a signal upon the passage of said card to a predetermined point on said path and mechanical means in said path for engagement by said card for stopping the further displacement thereof, said mechanical means being positioned relative to said signal producing means so as to engage said card in the cut-off region thereof when said card is in its proper orientation, at which position said card will actuate said signal producing means, said position of said mechanical means being selected so that when said card is not properly oriented, a portion of the leading edge of said card outside of said cut-off region engages said mechanical means at the end of said path, at which position said card does not actuate said signal producing means.

6. The card reader as recited in claim 5, wherein said signal producing means includes a bottom light source, a bottom light detector and means supporting said bottom light source and bottom light detector in spaced facing relation to define a light beam therebetween extending along a line extending substantially normally to the plane of the path of said card and positioned to permit said card to intercept said light beam to actuate said signal producing means; said bottom detector support means defining said mechanical means and including a substantially U-shaped member having a pair of arms and a base portion joining said pair of arms, one of said arms supporting each of said bottom light source and bottom light dector, said bottom detector support means further including means supporting said U-shaped member in the plane of said card at an angle such that said light beam lies further along said path in said one direction along said card then a region of the base portion of said U-shaped member, said region of said base portion of said U-shaped member being positioned to engage the cut-off region of the leading edge of a properly oriented card.

7. The card reader as recited in claim 6, wherein said wall of said card guide means is formed with a longitudinally extending slot for receipt of said U-shaped member to permit the displacement thereof.

8. The card reader as recited in claim 1, said light detection means being adapted to read the identifying indicia when the indicia-bearing portion of one of said cards is passed thereby; memory means coupled to said light detection means for temporarily storing data representative of the read indicia; means for detecting the passage of said card along a prescribed path in said guide means past said light detection means, said passage detecting means including means for counting the number of digits read by said light detection means; and means for enabling the transmitting from said memory means of the temporarily stored data representative of the read indicia at least in part, in response to an output of said light detection means representative of the counting of a predetermined number of digits.

9. The card reader of claim 8, wherein said passage detecting means includes selection means for selecting a predetermined count of said counting means corresponding to the number of digits on said card, and gate means for transmitting a signal representative of a correct count when the count of said counting means equals said selected count, said selection means including a plurality of first terminals, a pair of second terminals associated with each of said first terminals, means selectively electrically connecting each of said first terminals to one of said second terminals, and means electrically connecting said first and second terminals to said gate means and said counter means so that said predetermined count is determined by the one of each pair of second terminals to which the corresponding one of said first terminals is connected.

10. The card reader as recited in claim 8, wherein said indicia represent a code wherein each digit may include more than one aperture aligned along a line extending transverse of said card, and including data accumulation means intermediate said memory means and said light detection means for accumulating the data representing each digit of data; and means for applying the accumulated data from said data accumulation means to said memory means upon all of said plurality of light detection means detecting the absence of indicia representative of the space between adjacent digits on the card and thereafter clearing said data accumulation means for the receipt of the next digit of data.

11. The card reader as recited in claim 10, wherein said indicia is in the form of a hollerith code.

12. The card reader as recited in claim 10, including bottom detector means positioned at the end of said path for producing a bottom signal representative of the traverse of said card to the end of said path, said means for enabling the transmitting from said memory means of the temporarily stored data representative of the read indicia being at least in part, responsive to an output of said passage detection means representative of the combined occurrence of the counting of a predetermined number of digits and the bottom signal of said bottom detector.

13. The card reader as recited in claim 12, wherein said passage detecting means includes a latching circuit connected to receive said bottom signal and to continue to produce a signal representative of receipt of said bottom signal after cut-off of said bottom signal during the withdrawal of said card along said path; and means coupled to said light detection means for detecting withdrawal of said card along said path to a point past said light detection means, said card withdrawal detecting means being operatively coupled to said latching means to reset same upon detection of such card withdrawal.

14. The card reader as recited in claim 13, wherein said data accumulation means includes a plurality of R-S flip-flop circuits each including a set terminal operatively coupled to one of said plurality of light detection means; a reset terminal operatively coupled to said means for clearing said data accumulation means and an output terminal operatively coupled to said memory means and to said card withdrawal detection means, and including means operatively coupling the output of said latch circuit to the reset terminal of all of said R-S flip-flop circuits for maintaining said flip-flop circuits in a reset state during the traverse of said card from said bottom detector means to said point past said light detection means, said card withdrawal detection means including gate means responsive to the simultaneous appearance of a signal in the output terminals of all of said R-S flip-flop circuits of a state opposite to the state of the signal on the respective reset terminals of said flip-flops during card withdrawal.

15. The card reader as recited in claim 8, for use with a card having further indicia thereon comprising a predetermined number of optically distinguishable indicia spaced on said card along said one direction of said card, including means on said guide means for optically detecting said further indicia; said means for enabling the transmitting from said memory means of the temporarily stored data representative of the read indicia being, at least in part, responsive to an output of said passage detecting means representative of the combined occurrence of the counting of a predetermined number of digits and the detection of the predetermined number of said further indicia.

16. The card reader as recited in claim 1, wherein said spring member includes a portion projecting substantially in a direction away from said wall on each of the opposed sides of said elongated slot opening, as viewed in said one direction along said card, said projecting portions aiding in the shielding of said light detection means from stray light.

17. An on-the-fly card reader for use with a time card having identifying indicia in the form of punched holes on a portion thereof arranged in a plurality of digits spaced in one direction along said card and having a cut-off region in the leading edge thereof comprising card guide means defining a path for the displacement of said card in a direction substantially parallel to said one direction along said card; a plurality of light detection means mounted on one side of said path along a substantially straight line extending transverse to said one direction along said card; lamp housing means mounted in spaced facing relation relative to said plurality of light detection means on the opposed side of the path for illuminating said light detection means; bottom detector means for detecting the passage of said card along said path to the end thereof; and means displaceably mounting said bottom detector means in said one direction along said card for selectively setting the length of said path, said displaceable bottom detector means including means for producing a signal upon the passage of said card to a predetermined point on said path and mechanical means in said path for engagement by said card for stopping the further displacement thereof, said mechanical means being positioned relative to said signal producing means so as to engage said card in the cut-off region thereof when said card is in its proper orientation, at which position said card will actuate said signal producing means, said position of said mechanical means being selected to that when said card is not properly oriented, a portion of the leading edge of said card outside of said cut-off region engages said mechanical means at the end of said path, at which position said card does not actuate said signal producing means, said signal producing means including a bottom light source, a bottom light detector, and means supporting said bottom light source and bottom light detector in spaced facing relation to define a light beam therebetween extending along a line extending substantially normally to the plane of the path of said card and positioned to permit said card to intercept said light means to actuate said signal producing means; said bottom detector support means defining said mechanical means and including a substantially U-shaped member having a pair of arms and a base portion joining said pair of arms, one of said arms supporting each of said bottom light source and bottom light detector, said bottom detector support means further including means supporting said U-shaped member in the plane of said card at an angle such that said light beam lies further along said path in said one direction along said card then a region of the base portion of said U-shaped member, said region of said base portion of said U-shaped member being positioned to engage the cut-off region of the leading edge of a properly oriented card.

18. The card reader as recited in claim 17, wherein said signal producing means includes a bottom light source, a bottom light detector, and means supporting said bottom light source and bottom light detector in spaced facing relation to define a light beam therebetween extending along a line extending substantially normally to the plane of the path of said card and position to permit said card to intercept said light means to actuate said signal producing means; said bottom detector support means defining said mechanical means and including a substantially U-shaped member having a pair of arms and a base portion joining said pair of arms, one of said arms supporting each of said bottom light source and bottom light detector, said bottom detector support means further including means supporting said U-shaped member in the plane of said card at an angle such that said light beam lies further along said path in said one direction along said card then a region of the base portion of said U-shaped member, said region of said base portion of said U-shaped member being positioned to engage the cut-off region of the leading edge of a properly oriented card.

19. The card reader as recited in claim 18, wherein said bottom light source and said bottom light detector are solid state devices.

20. The card reader as recited in claim 18, said light detection means being adapted to read the identifying indicia when the indicia-bearing portion of one of said cards is passed thereby; memory means coupled to said light detection means for temporarily storing data representative of the read indicia; means for detecting the passage of said card along a prescribed path in said guide means past said light detection means, said passage detecting means including means for counting the number of digits read by said light detection means; and means for enabling the transmitting from said memory means of the temporarily stored data representative of the read indicia, at least in part, in response to an output of said light detection means representative of the counting of a predetermined number of digits.

21. The card reader of claim 20, wherein said passage detecting means includes selection means for selecting a predetermined count of said counting means corresponding to the number of digits on said card, and gate means for transmitting a signal representative of a correct count when the count of said counting means equals said selected count, said selection means including a plurality of first terminals, a pair of second terminals associated with each of said first terminals, means selectively electrically connecting each of said first terminals to one of said second terminals, and means electrically connecting said first and second terminals to said gate means and said counter means so that said predetermined count is determined by the one of each pair of second terminals to which the corresponding one of said first terminals is connected.

22. The card reader as recited in claim 21, wherein said indicia represent a code wherein each digit may include more than one aperture aligned along a line extending transverse of said card, and including data accumulation means intermediate said memory means and said light detection means for accumulating the data representing each digit of data; and means for applying the accumulated data from said data accumulation means to said memory means upon all of said plurality of light detection means detecting the absence of indicia representative of the space between adjacent digits on the card and thereafter clearing said data accumulation means for the receipt of the next digit of data.

23. The card reader as recited in claim 22, wherein said indicia is in the form of a hollerith code.

24. The card reader as recited in claim 20, wherein said means for enabling the trasmitting from said memory means of the temporarily stored data representative of the read indicia being, at least in part, responsive to an output of said passage detection means representative of the combined ocurrence of the counting of a predetermined number of digits and the bottom signal of said bottom detector.

25. The card reader as recited in claim 24, wherein said passage detecting means includes a latching circuit connected to receive said bottom signal and to continue to produce a signal representative of receipt of said bottom signal after cut-off of said bottom signal during the withdrawal of said card along said path; and means coupled to said light detection means for detecting withdrawal of said card along said path to a point past said light detection means, said card withdrawal detecting means being operatively coupled to said latching means to reset same upon detection of such card withdrawal.

26. The card reader as recited in claim 25, wherein said data accumulation means includes a plurality of R-S flip-flop circuits each including a set terminal operatively coupled to one of said plurality of light detection means; a reset terminal operatively coupled to said means for clearing said data accumulation means and an output terminal operatively coupled to said memory means and to said card withdrawal detection means, and including means operatively coupling the output of said latch circuit to the reset terminal of all of said R-S flip-flop circuits for maintaining said flip-flop circuits in a reset state during the traverse of said card from said bottom detector means to said point past said light detection means, said card withdrawal detection means including gate means responsive to the simultaneous appearance of a signal in the output terminals of all of said R-S flip-flop circuits of a state opposite to the state of the signal on the respective reset terminals of said flip-flops during card withdrawal.

27. The card reader as recited in claim 20, for use with a card having further indicia thereon comprising a predetermined number of optically distinguishable indicia spaced on said card along said one direction of said card, including means on said guide means for optically detecting said further indicia; said means for enabling the transmitting from said memory means of the temporarily stored data representative of the read indicia being, at least in part, responsive to an output of said passage detecting means representative of the combined occurrence of the counting of a predetermined number of digits and the detection of the predetermined number of said further indicia.

28. An on-the-fly card reader for use for a card having indicia on a portion thereof arranged in a plurality of digits spaced in one direction along said card comprising card guide means defining a path for the displacement of said card in a direction substantially parallel to said one direction along said card; detection means in the path of displacement of said card for reading of said indicia when the indicia-bearing portion of one of said cards is passed thereby; memory means coupled to said detection means for temporarily storing data representative of the read indicia; means for detecting the passage of said card along a prescribed path in said guide means past said detection means, said passage detecting means including means for counting the number of digits read by said detection means; selection means for selecting a predetermined count of said counting means corresponding to the number of digits on said card; gate means for transmitting a signal representative of a correct count when the count of said counting means equals said selected count, said selection means including a plurality of first terminals, a pair of second terminals associated with each of said first terminals, means selectively electrically connecting each of said first terminals to one of said second terminals, and means electrically connecting said first and second terminals to said gate means and counter means so that said predetermined count is determined by the one of each pair of said second terminals to which the corresponding one of said first terminals is connected; and means for enabling the transmitting from said memory means of the temporarily stored data representative of the read indicia, at least in part, in response to the output of said gate means representative of the counting of a predetermined number of digits.

29. The card reader as recited in claim 28, wherein said indicia represent a code wherein each digit may include more than one aperture aligned along a line extending transverse of said card, and including data accumulation means intermediate said memory means and said light detection means for accumulating the data representing each digit of data; and means for applying the accumulated data from said data accumulation means to said memory means upon all of said plurality of light detection means detecting the absence of indicia representative of the space between adjacent digits on the card and thereafter clearing said data accumulation means for the receipt of the next digit of data.

30. The card reader as recited in claim 29, wherein said indicia is in the form of a hollerith code.

31. The card reader as recited in claim 28, including bottom detector means positioned at the end of said path for producing a bottom signal representative of the traverse of said card to the end of said path, said means for enabling the transmitting from said memory means of the temporarily stored data representative of the read indicia being at least in part, responsive to an output of said passage detection means representative of the combined occurrence of the counting of a predetermined number of digits and the bottom signal of said bottom detector.

32. The card reader as recited in claim 31, wherein said passage detecting means includes a latching circuit connected to receive said bottom signal and to continue to produce a signal representative of receipt of said bottom signal after cut-off of said bottom signal during the withdrawal of said card along said path; and means coupled to said light detection means for detecting withdrawal of said card along said path to a point past said light detection means, said card withdrawal detecting means being operatively coupled to said latching means to reset same upon detection of such card withdrawal.

33. The card reader as recited in claim 32, wherein said data accumulation means includes a plurality of R-S flip-flop circuits each including a set terminal operatively coupled to one of said plurality of light detection means; a reset terminal operatively coupled to said means for clearing said data accumulation means and an output terminal operatively coupled to said memory means and to said card withdrawal detection means, and including means operatively coupling the output of said latch circuit to the reset terminal of all of said R-S flip-flop circuits for maintaining said flip-flop circuits in a reset state during the traverse of said card from said bottom detector means to said point past said light detection means, said card withdrawal detection means including gate means responsive to the simultaneous appearance of a signal in the output terminals of all of said R-S flip-flop circuits of a state opposite to the state of the signal on the respective reset terminals of said flip-flops during card withdrawal.

34. The card reader as recited in claim 28, for use with a card having further indicia thereon comprising a predetermined number of optically distinguishable indicia spaced on said card along said one direction of said card, including means on said guide means for optically detecting said further indicia; said means for enabling the transmitting from said memory means the temporarily stored data representative of the read indicia being, at least in part, responsive to an output of said passage detecting means representative of the combined occurrence of the counting of a predetermined number of digits and the detection of the predetermined number of said further indicia.

35. An on-the-fly card reader for use with a card having identifying indicia on a portion thereof arranged in a plurality of digits spaced in one direction along said card and adapted for displacement along a prescribed path in a direction substantially parallel to said one direction along said path, said indicia representing a code wherein each digit may include more than one aperture aligned along a line extending transverse to said card, comprising detection means in the path of displacement of said card for reading of identifying indicia when the indiciabearing portion of said card is passed thereby; memory means coupled to said detection means for temporarily storing data representative of the read indicia; means for detecting the passage of said card along said prescribed path past said detection means; means for enabling the transmitting from said memory means of the temporarily stored data representative of the read indicia in response to an output of said passage detecting means; data accumulation means intermediate said memory means and said light detection means for accumulating the data representing each digit of data; and means for applying the accumulated data from said data accumulation means to said memory means upon all of said plurality of light detection means detecting the absence of indicia representative of the space between adjacent digits on the card and thereafter clearing said data accumulation means for the receipt of the next digit of data.

36. The card reader as recited in claim 35, wherein said indicia is in the form of a hollerith code.

37. The card reader as recited in claim 35, wherein said passage detecting means includes means for counting the number of digits read by said counting means and bottom detector means positioned at the end of said path for producing a bottom signal respresentative of the traverse of said card to the end of said path, said means for enabling the transmitting from said memory means of the temporarily stored data representative of the read indicia being, at least in part, responsive to an output of said passage detecting means representative of the combined occurence of the counting of a predetermined number of digits and the bottom signal of said bottom detector.

38. The card reader as recited in claim 38, wherein said passage detecting means includes a latching circuit connected to receive said bottom signal and to continue to produce a signal representative of receipt of said bottom signal after cut-off of said bottom signal during the withdrawal of said card along said path; and means coupled to said light detection means for detecting withdrawal of said card along said path to a point past said light detection means, said card withdrawal detecting means being operatively coupled to said latching means to reset same upon detection of such card withdrawal.

39. The card reader as recited in claim 38, wherein said data accumulation means includes a plurality of R-S flip-flop circuits each including a set terminal operatively coupled to one of said plurality of light detection means; a reset terminal operatively coupled to said means for clearing said data accumulation means and an output terminal operatively coupled to said memory means and to said card withdrawal detection means, and including means operatively coupled the output of said latch circuit to the reset terminal of all of said R-S flip-flop circuits for maintaining said flip-flop circuits in a reset state during the traverse of said card from said bottom detector means to said point past said light detection means, said card withdrawal detection means including gate means responsive to the simultaneous appearance of a signal in the output terminals of all of said R-S flip-flop circuits of a state opposite to the stage of the signal on the respective reset terminals of said flip-flop during card withdrawal.

40. An on-the-fly card reader for use for a time card having identifying indicia on a portion thereof arranged in a plurality of digits spaced in one direction along said card and having further indicia thereon consisting of a predetermined number of optically distinguishable indicia spaced on said card along said one direction of said card, comprising card guide means defining a path for the displacement of said card in a direction substantially parallel to said one direction along said card; detection means in the path of displacement of said card for reading of said first-mentioned indicia when the indicia-bearing portion of one of said cards is passed thereby; memory means coupled to said detection means for temporarily storing data representative of the read first-mentioned indicia; means for detecting the passage of said card along a prescribed path in said guide means past said detection means, said passage detecting means including means for couting the number of digits read by said detection means; and means for optically detecting said further indicia, said passage detecting means including means for counting the number of said further indicia detected by said further indicia detecting means; and means for enabling the transmitting from said memory means of the temporarily stored data representative of the read indicia, at least in part, to the combined occurrence of the counting of a predetermined number of digits of said first-mentioned indicia and the counting of a predetermined number of said further indicia.

41. The card reader as recited in claim 40, wherein said further indicia detecting means comprises reflective light source and detector means positioned on one side of the path of said card.

* * * * *